United States Patent
Diamanti et al.

(10) Patent No.: US 6,683,531 B2
(45) Date of Patent: Jan. 27, 2004

(54) COUPLING DEVICE FOR PROVIDING A COMMUNICATIONS LINK FOR RF BROADBAND DATA SIGNALS TO A POWER LINE AND METHOD FOR INSTALLING SAME

(75) Inventors: Paolo Diamanti, Scarborough (CA); Ross Donald McTaggart, Scarborough (CA); Miloje Tanaskovic, Scarborough (CA)

(73) Assignee: Trench Limited, Scarborough (CA)

( * ) Notice: Subject to any disclaimer, the term of this patent is extended or adjusted under 35 U.S.C. 154(b) by 262 days.

(21) Appl. No.: 09/846,475

(22) Filed: May 2, 2001

(65) Prior Publication Data

US 2001/0038329 A1 Nov. 8, 2001

(30) Foreign Application Priority Data

May 4, 2000 (CA) .............................. 2307808

(51) Int. Cl.[7] .............................................. H04M 11/04
(52) U.S. Cl. ...................... 340/310.03; 340/310.01; 340/310.07; 340/310.08; 340/635
(58) Field of Search ....................... 340/310.01, 310.03, 340/310.07, 310.08, 635

(56) References Cited

U.S. PATENT DOCUMENTS

| | | | |
|---|---|---|---|
| 4,142,178 A | | 2/1979 | Whyte et al. |
| 5,864,284 A | | 1/1999 | Sanderson |
| 6,037,678 A | * | 3/2000 | Rickard ..................... 307/89 |
| 6,040,759 A | | 3/2000 | Sanderson |
| 6,154,488 A | * | 11/2000 | Hunt ......................... 375/219 |
| 6,407,987 B1 | * | 6/2002 | Abraham ................... 370/295 |

* cited by examiner

Primary Examiner—Julie Lieu
(74) Attorney, Agent, or Firm—Freedman & Associates

(57) ABSTRACT

A coupling device for providing a communications link for RF broadband data signals to a power line is disclosed. The coupling device comprises a high-pass filter element connected to the power line via a first port. The filter element allows RF broadband data signals to pass while low frequency signals are substantially attenuated. A second port connected to the high-pass filter element provides the RF broadband data signals to a RF broadband data signal line at a customer's premise. A drain coil connected to the high-pass filter element and connected to a ground provides grounding for low frequency signals but prevents the RF broadband data signals from being grounded. The second port and the drain coil are protected from power surges by a protective device connected in parallel to the drain coil. The coupling device is inexpensive to manufacture, essentially maintenance free, and easy to install. In a preferred embodiment such a coupling device is installable absent a step of disconnecting power to the power line which provides power to a customer's premise. Therefore, power supply to neighboring premises served by the same power line is not interrupted during installation.

19 Claims, 7 Drawing Sheets

First:

connecting a ground terminal of the coupling device to a ground terminal connected to a ground connecting a port of the coupling device for connection to a RF broadband data signal line to a same

Second:

connecting a port of the coupling device for connection to a power input line of a premise to a same

Third:

connecting a port of the coupling device for connection to a power line to the power line comprising a power signal

Fig. 5

COUPLING DEVICE FOR PROVIDING A COMMUNICATIONS LINK FOR RF BROADBAND DATA SIGNALS TO A POWER LINE AND METHOD FOR INSTALLING SAME

FIELD OF THE INVENTION

The invention relates generally to coupling of RF signals, in particular to a device for coupling broadband RF signals for transmission through power lines and a method for installing same.

BACKGROUND OF THE INVENTION

In the past, the only information service provided to customers such as businesses or private households was a telephone line. With technological advances more and more information services are provided to customers such as cable television, alarm connection, high speed Internet connection and so forth. In order to provide all these information services to customers each service provider has to run a dedicated cable to the premises of their customers. Each dedicated line is proprietary to the service provider and, therefore, has to be maintained by that service provider.

A significant expense in providing service to subscribers, is the physical link to the subscribers. Cable lines are often cut during gardening and other digging activities. Also, animals can break connections. There is a substantial expense in laying the original cables to the premise of each customer. Furthermore, an increasing number of different information services received by a customer require the installation of a plurality of physical links to the premise of a single customer.

In order to overcome these difficulties, it has been proposed to use a wireless communication system to provide all services. Unfortunately, this is generally costly and presents a plurality of drawbacks. Therefore, it is slow to gain wide acceptance and is even suffering difficulties in finding test areas.

One form of service that is provided in industrial nations to every household is electrical power. In areas serviced by a power company, an electrical connection to each household allows for power delivery. Further, the power lines are monitored regularly and are pole mounted or buried deep underground for safety.

For a power line to serve as a communications link transmitting high-speed data a device is needed for reliably coupling the high-speed data to the power line. In addition such a device has to be inexpensive, essentially maintenance free and easy to install in existing installations at a customer's premise with minimum interruption or without interruption of the power supply to other neighboring premises in order to compete with contending technologies. Furthermore, such a device has to guarantee safety by isolating the communications function from the power supply function at the customer's premise.

Several devices for coupling communications signals to a power line have been proposed in the following references, which are hereby incorporated by reference:

U.S. Pat. No. 4,142,178 issued Feb. 27, 1979 to Whyte et al.;

U.S. Pat. No. 5,864,284 issued Jan. 26, 1999 to Sanderson; and,

U.S. Pat. No. 6,040,759 issued Mar. 21, 2000 to Sanderson.

All these proposed devices are very complex in their structure requiring maintenance and are expensive to manufacture. Furthermore, these devices are difficult to install requiring disconnecting supply to the power line prior to the installation. Thus, these devices defeat their purpose for providing an inexpensive communications link to a customer's premise that is easily installed.

It is, therefore, an object of the invention to overcome the drawbacks of the prior art and to provide a device for coupling RF broadband data signals to a power line that is inexpensive, and essentially maintenance free.

It is another object of the invention to provide a device for coupling RF broadband data signals to a power line that can be installed at a customer's premise without disconnecting power to the power line.

It is further an object of the invention to provide a method for installing a device for coupling RF broadband data signals to a power line without disconnecting power to the power line during installation.

SUMMARY OF THE INVENTION

In order to overcome these and other limitations of the prior art, there is provided in accordance with the invention a coupling device for injecting and extracting a RF broadband data signal to and from a power line. The coupling device is inexpensive to manufacture, essentially maintenance free, and easy to install. In a preferred embodiment such a coupling device is installable absent a step of disconnecting power to the power line which provides power to a customer's premise. Therefore, power supply to neighboring premises served by the same power line is not interrupted during installation.

In accordance with the invention there is provided a coupling device for providing a communications link for RF broadband data signals to a power line comprising:

a first port for connection to a power line;

a high-pass filter element connected to the first port, the filter element allowing RF broadband data signals to pass while substantially attenuating low frequency signals; and, a second port connected to the high-pass filter element for connection to a RF broadband data signal line.

In accordance with the invention there is further provided a coupling device for providing a communications link for RF broadband data signals to a power line comprising:

a first port for connection to a power line;

a high-pass filter element connected to the first port, the filter element allowing RF broadband data signals to pass while substantially attenuating low frequency signals, wherein the high-pass filter element is connected to the first port via a cable having shielding spaced from the core at a sufficient distance to effectively limit noise resulting from the cable shielding in order to permit extraction of a RF broadband signal absent substantial noise; and, a second port connected to the high-pass filter element for connection to a RF broadband data signal line.

In accordance with the invention there is further provided a coupling device for providing a communications link for RF broadband data signals to a power line comprising:

a first port for connection to a power line;

a high-pass filter element connected to the first port, the filter element allowing RF broadband data signals to pass while substantially attenuating low frequency signals;

a second port connected to the high-pass filter element for connection to a RF broadband data signal line;

a drain coil connected to the high-pass filter element and connected to ground, the drain coil providing grounding for low frequency signals but preventing the RF broadband data signals from being grounded; and, a protective device connected in parallel to the drain coil for protecting the second port and the drain coil.

According to an aspect of the invention there is provided a coupling device for providing a communications link for RF broadband data signals to a power line comprising:

a first port for connection to a power line;

a second port for connection to a power input line of a premise and electrically connected to the first port via a power passthrough for providing power to the premise, wherein the power passthrough comprises a cable having shielding spaced from the core at a sufficient distance to prevent substantial noise from occurring within the RF broadband data signal;

a high-pass filter element connected to the power passthrough, the filter element allowing RF broadband data signals to pass while substantially attenuating low frequency signals;

a third port connected to the high-pass filter element for connection to a RF broadband data signal line;

a ground terminal for connection to ground;

a drain coil connected to the high-pass filter element and connected to the ground terminal, the drain coil providing grounding for low frequency signals but preventing the RF broadband data signals from being grounded; and, a protective device connected in parallel to the drain coil for protecting the third port and the drain coil.

According to another aspect of the invention there is provided a method for installing a coupling device for providing a communications link for RF broadband data signals to a power line while the power line is provided with a power signal, the method comprising the steps of:

first connecting a ground terminal of the coupling device to a ground terminal connected to a ground and connecting a port of the coupling device for connection to a RF broadband data signal line to a same;

second connecting a port of the coupling device for connection to a power input line of a premise to a same; and, third connecting a port of the coupling device for connection to a power line to the power line comprising a power signal.

BRIEF DESCRIPTION OF THE DRAWINGS

A description of the invention will now be provided with reference to the attached drawings in which.

DETAILED DESCRIPTION OF THE INVENTION

Figure 1:
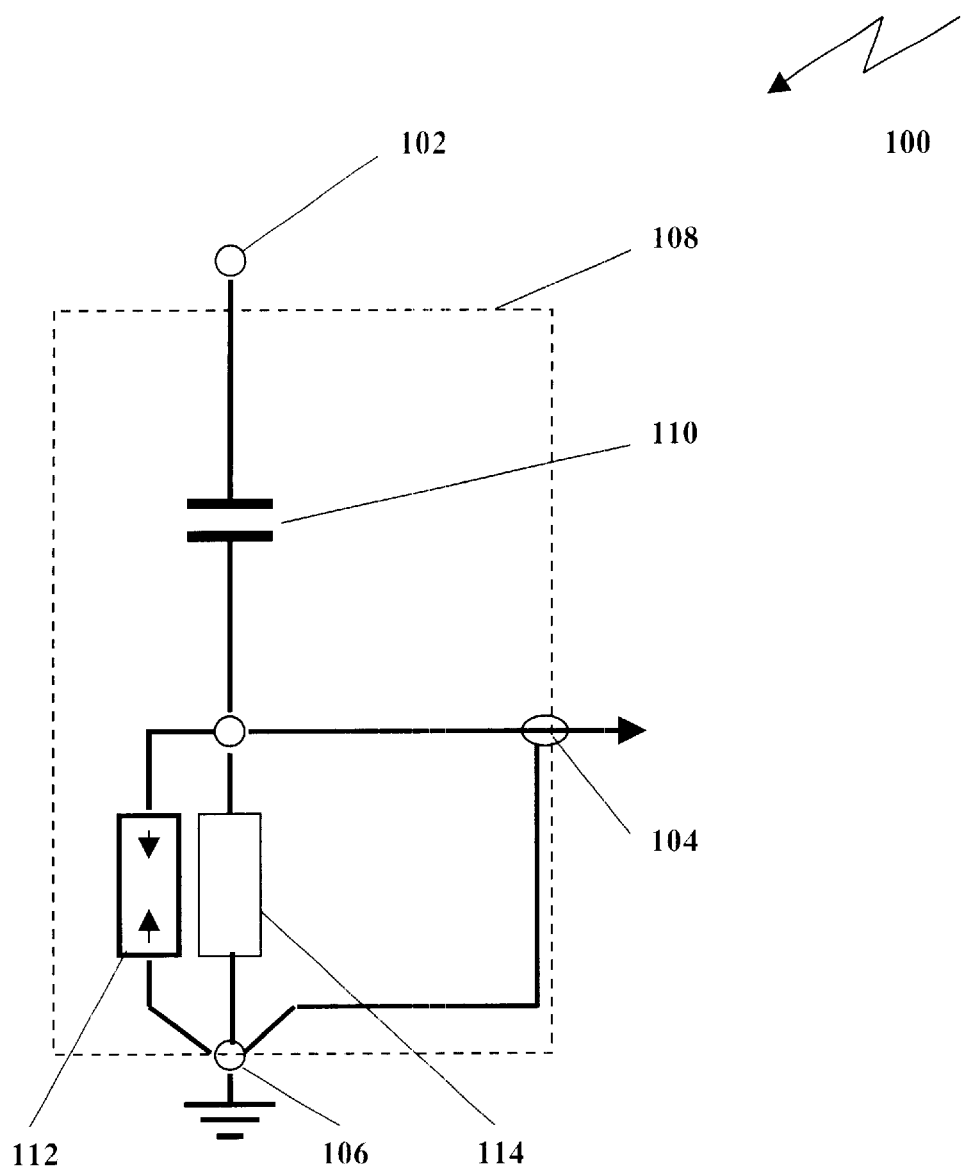
FIG. 1 is a schematic block diagram of a coupling device according to the invention.

Referring to FIG. 1 a coupling device 100 according to the invention for providing a communications link for RF broadband data signals to a power line is shown. In the following the device is described for installation at a customer's premise, i. e. connected to a distribution power network operating at medium or low voltage for coupling data signals in a frequency range of approximately 1 MHz to 40 MHz. As is obvious to a person of skill in the art, the device is described in connection with this application for simplicity but is not limited thereto. It is evident that the concept of this device is also operable in applications operating at higher voltage and/or higher data signal frequencies, for example, bypassing transformers between high voltage power lines and medium voltage power lines in a power supply network.

The coupling device 100 comprises a first port 102 for providing a connection to a power line providing electrical power to a customer's premise, a second port 104 for providing a connection to a customer's RF broadband data signal line and a ground terminal 106 for providing a connection to a ground. The coupling device 100 further comprises a coupling circuit housed in a grounded housing 108 as shown in FIG. 1. Optionally, the housing 108 is not grounded, but use of this should be restricted to coupling devices which are pole mounted, installed in substations, installed in service entrances or installed inside transformer enclosures for safety reasons. In other applications the housing of the coupling device should be safe to touch. The coupling circuit comprises a high-pass filter element 108 such as a coupling capacitor that is connected at one end to the port 102. The filter element 110 allows RF broadband data signals to pass while substantially attenuating low frequency signals. The other end of the filter element 110 is connected to the second port 104 for providing extracted RF broadband data signals to the customer's data signal network and for receiving RF broadband data signals from the customer's network and for coupling onto the power line via the port 102. The other end of the filter element 110 is connected to the ground terminal 106 via a protective device 112 and a drain coil 114 connected in parallel. The protective device 112 provides protection for the drain coil 114 and the data signal line—second port 104—from power surges induced, for example, by a lightning strike into the power line. For coupling of high frequency data signals a spark gap is preferably used as protective device 112 for having substantially no capacitance that could have an impact on the high frequency data signal. The drain coil 114, for example, an inductor, provides grounding for low frequency signals such as the power frequency component but prevents the high frequency data signal from being grounded. Shielding of the RF data signal line is connected to the ground terminal at the second port 104. Optionally, the data signal line—second port 104—is also provided with a protective device such as a spark gap interposed between the data signal line and the ground terminal to enhance safety for the data signal line. The coupling device according to the invention provides coupling of analog data signals as well as digital signals for transmission via power lines.

A significant application of the coupling device according to the invention is to efficiently couple RF broadband data signals for distribution via a power line, reaching customers of information service providers. The coupling devices are installed at a customer's premise for coupling a RF broadband data signal line to the distribution power line. Another application of the coupling device is installation to bypass transformers in the distribution power line. The coupling device provides for these applications a low impedance coupling means for RF broadband data signals. Preferably, the coupling device has minimal insertion loss over the operating bandwidth to ensure overall system performance over inherently poor S/N (signal to noise) power lines.

Therefore, the coupling device according to the invention has to efficiently couple RF broadband data signals in a frequency range of approximately 1 MHz to 40 MHz transmitted via medium voltage power lines. Most prior art systems pass lower frequency signals of 20 KHz to 500 KHz thereby avoiding many of the problems encountered in higher frequency applications. To pass higher frequencies, a self-resonant frequency of the filter element 110 has to be very high, to ensure the least possible signal attenuation over the frequency range to be passed. The inductance value of the drain coil is appropriately selected to avoid substantial attenuation of the radio frequency signals and provide a virtual ground for the coupling circuit at power frequency—normally 50 Hz or 60 Hz. The coupling circuit—primarily the filter element 110 is (PD) partial-discharge free, i. e. less than 10 pC at maximum operating voltage phase to ground. Unless the connections are free of internal discharges the service life is reduced due to PD based aging. When these limits are not met the data signal quality is substantially reduced due to high frequency signal interference or the coupling circuit is non-functional. Connection methodology and external connection geometry are considerations for design and analysis.

In order to provide a partial discharge free and a substantially maintenance free coupling device insulation systems for use with the invention include substantially inert gases such as SF6 or Nitrogen, liquids such as insulating oils, or a solid dielectric insulation system. Other embodiments include vacuum and/or pressure impregnation of capacitors, a resin molded structure and the use of ceramic or silicone rubber coatings, protective sheds, covers, etc.

Figure 2:
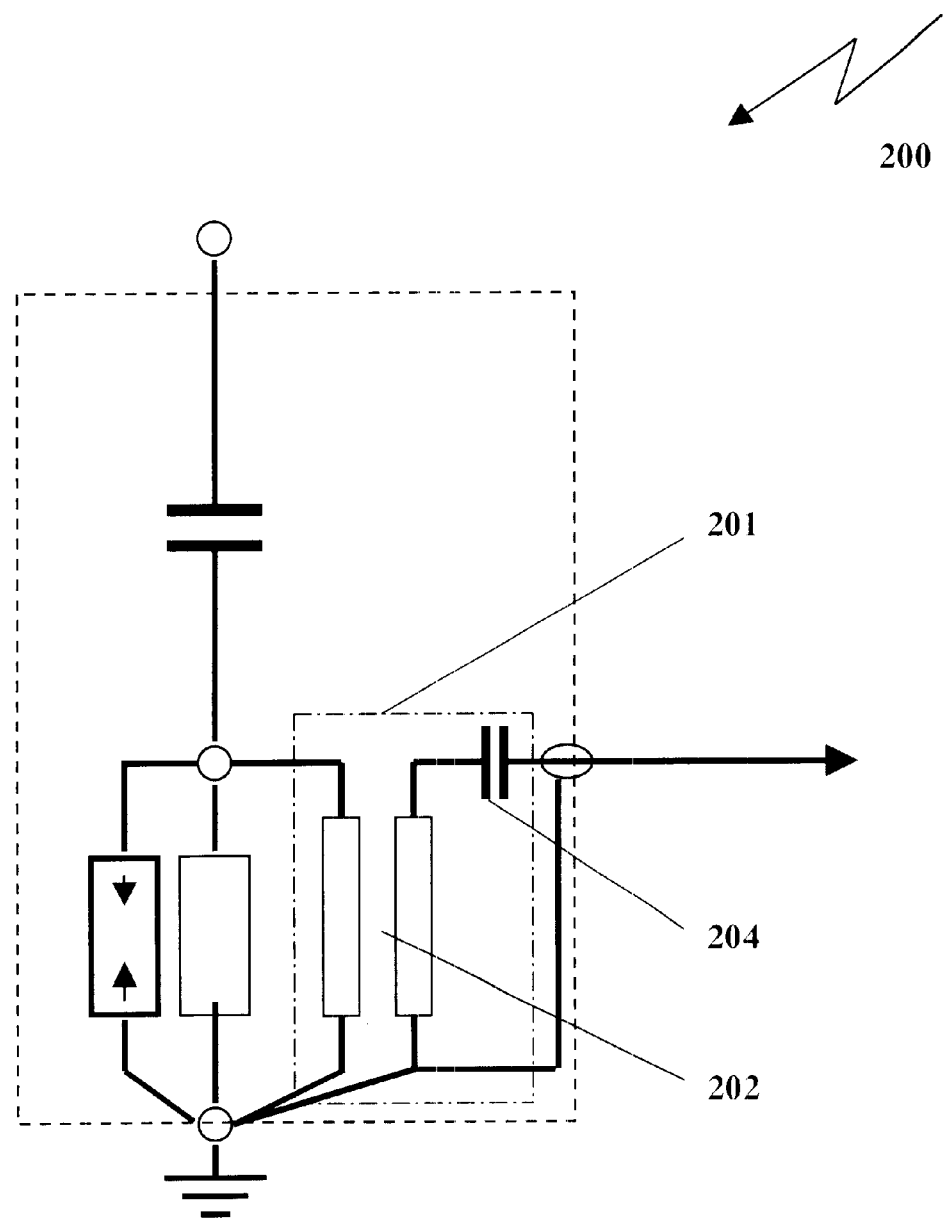
FIG. 2 is a simplified block diagram of a another embodiment of a coupling device according to the invention.

In another embodiment of a coupling device 200 according to the invention shown in FIG. 2 the coupling circuit further comprises an impedance matching circuit 201 comprising a transformer 202 and a coupling capacitor 204. The combination of the characteristics of the transformer 202 and the coupling capacitor 204 allows matching of the coupling circuit impedance with the impedance of the customer's data signal network. This provides an optimal data signal having the least attenuation. Preferably, the impedance matching circuit is easily adjustable or comprises an easily removable module inserted in the housing 108. This allows easy and quick adjustment to a customer's data network impedance either on site during installation or before delivery of the coupling device.

In the past, attempts at extracting RF broadband signals from power lines have resulted in signals that are too noisy for most uses. Therefore, these approaches have not been successful and no suitable means for extracting a RF broadband signal from a power line are known. The inventor has found that much of the noise within the extracted RF broadband signals emanates from cabling within the extraction device.

Therefore, the adequate control of electrical stresses in the cables and connections is necessary for the successful implementation of the invention.

Figure 3:
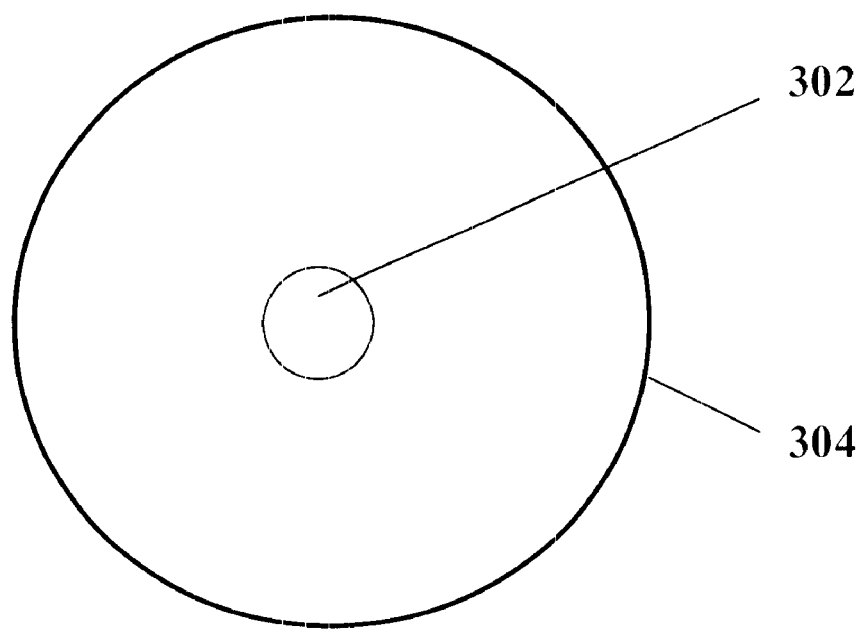
FIG. 3 is a simplified diagram illustrating a cross section of a power cable used in the coupling device according to the invention.

Typical distribution voltage or high voltage power cables are not well suited for use in devices for coupling a RF broadband signal. According to the invention a cable as shown in FIG. 3 is used having a core 302 and a neutral shielding 304, wherein the neutral shielding 304 is spaced from the core 302 a sufficient distance to prevent substantial noise from occurring within the RF broadband signal.

Figure 4A:
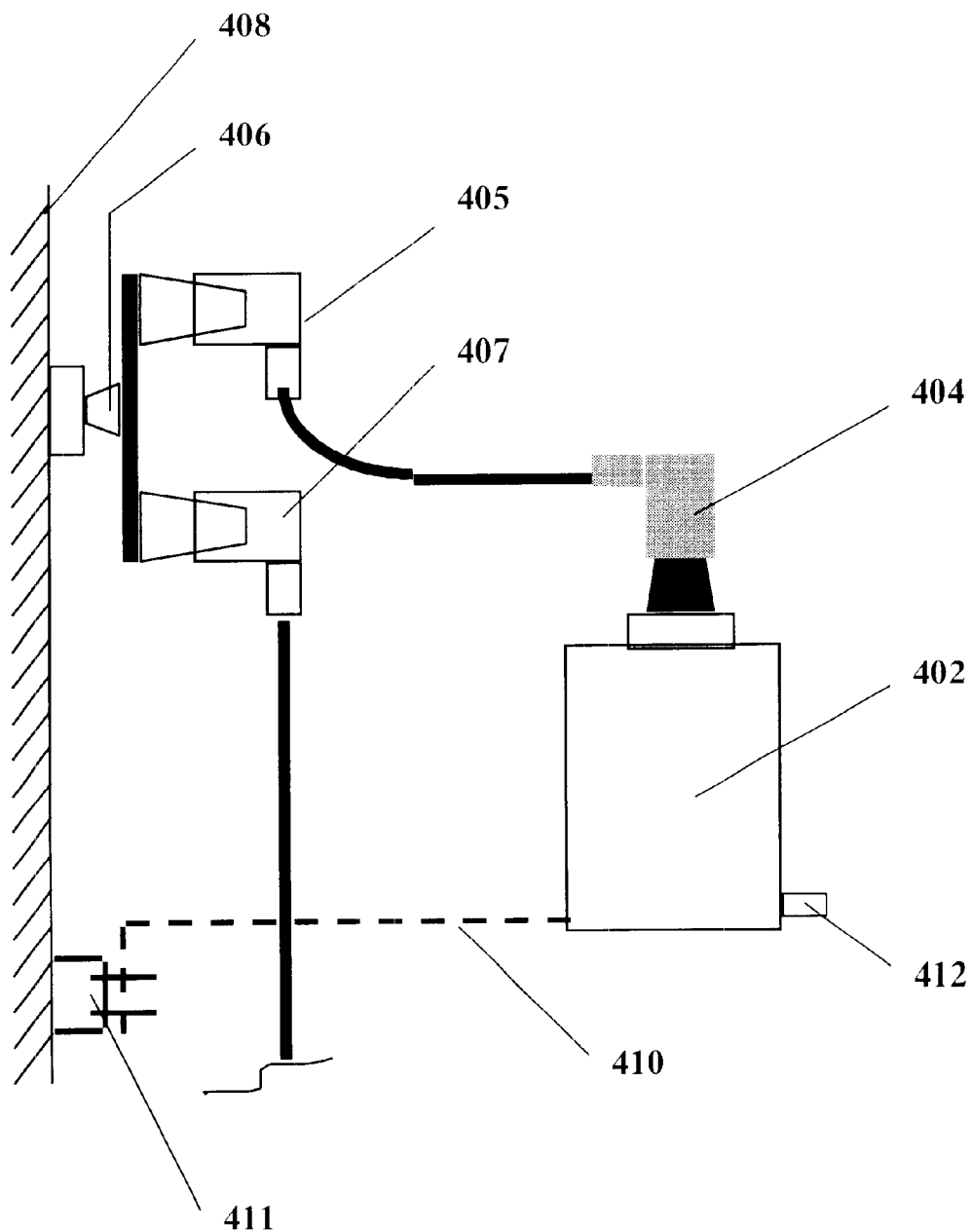
FIG. 4a is a simplified block diagram illustrating an installation of the coupling device according to the invention.
Figure 4B:
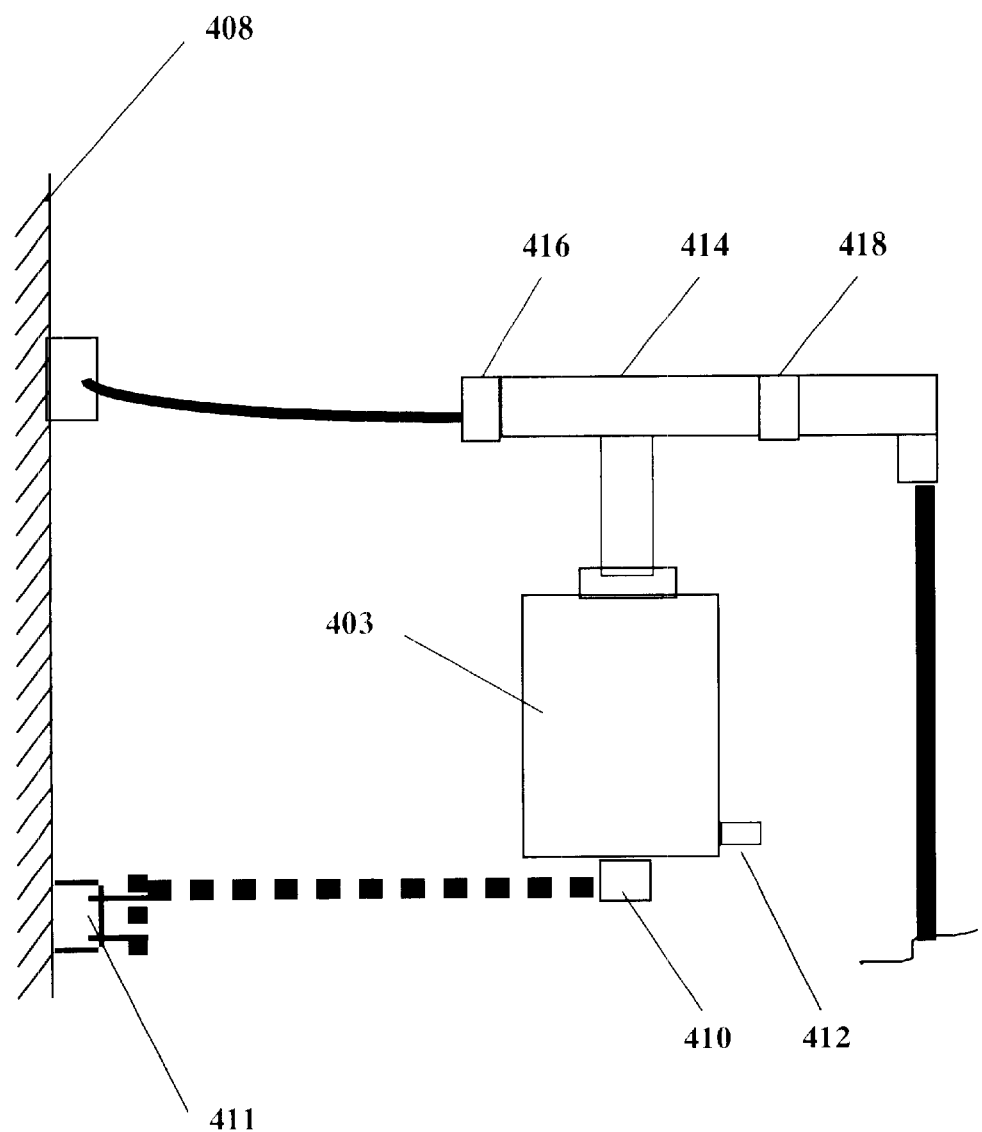
FIG. 4b is a simplified block diagram illustrating another installation of the coupling device according to the invention.
Figure 4C:
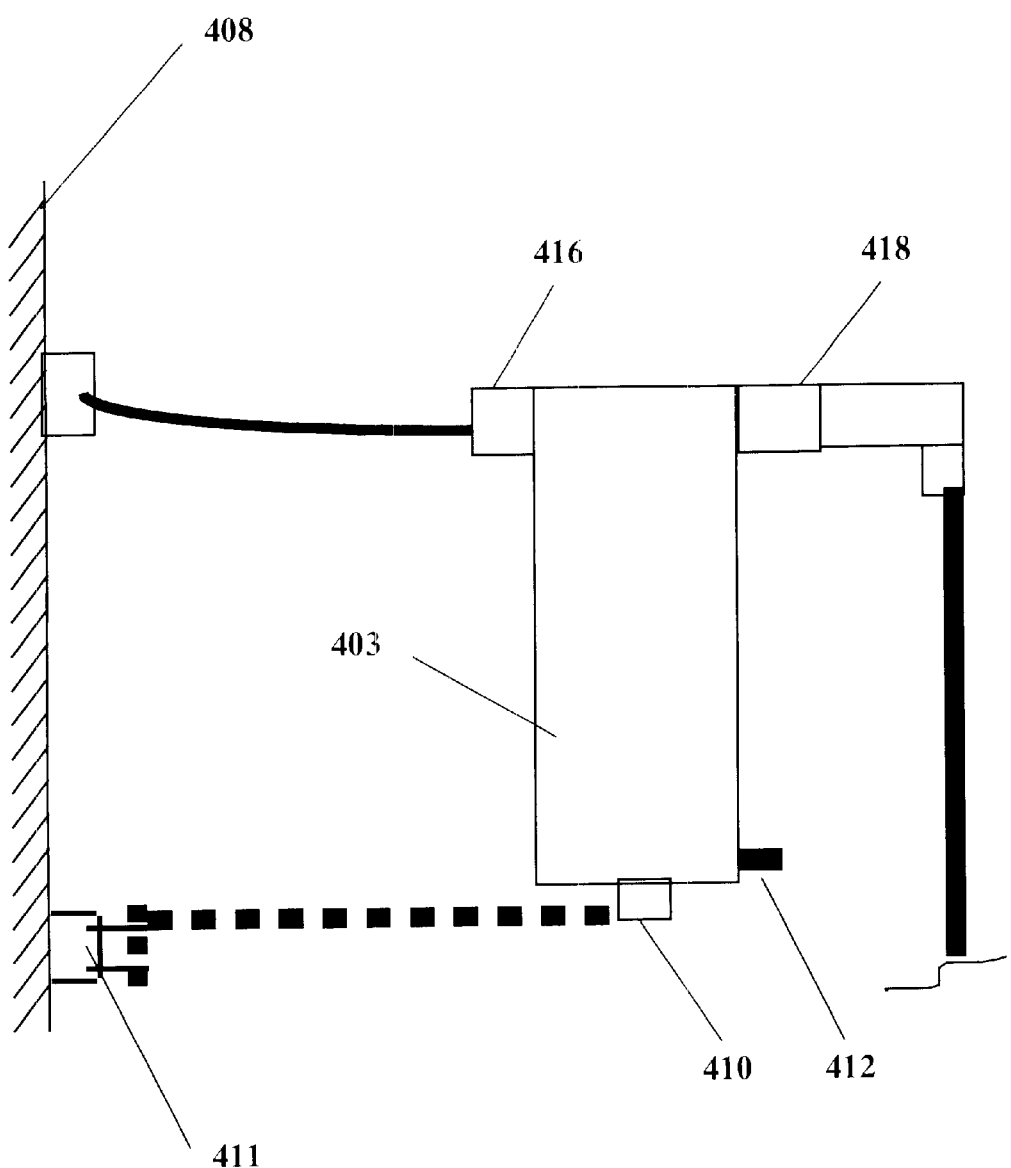
FIG. 4c is a simplified block diagram illustrating yet another installation of the coupling device according to the invention; and, FIG. 5 is a simplified flow diagram of a method according to the invention for installing the coupling device.

Referring to FIGS. 4a to 4c, different embodiments show installation of the coupling device according to the invention. The coupling device 402 shown in FIG. 4a comprises one input port 404 for connecting to a power line. As illustrated, the coupling device is connected to the power line—transformer—via port 405 of feedthru insert 406 connected to the transformer 408. High voltage power is provided to the transformer via port 407. The coupling device is grounded by grounding means 410 such as a grounding bracket mounted to a grounding bar 411. For safe operation the coupling device must be connected to a ground. For applications other than pole mounted devices the housing and connections must be safe to touch, i. e. connected to a ground. The housing, in order to be properly grounded, is preferably anchored to a ground terminal by a bolt. A RF broadband data signal connection is provided by port 412. This type of installation is preferably used for test purposes. The coupling device 403, shown in FIG. 4b comprises a power passthrough 414 connected to the coupling device 403. Port 416 of the power passthrough 414 is connected to transformer 408 or, alternatively, to a distribution power line. Port 416 is connected to the transformer via a cable as shown in FIG. 4b or, alternatively, is directly connected to the transformer 408. Port 418 is connected to the high power line. The coupling device is grounded via grounding connection 410. An extracted RF broadband data signal is provided via port 412. The power passthrough 414 is connected to the coupling device 403 via a flexible power cable facilitating installation in confined spaces or, alternatively is integrated in the housing of the coupling device, as shown in FIG. 4c. Thus, a coupling device as shown in FIGS. 4b and 4c is installable and removable absent further components.

The coupling device according to the invention allows installation for both overhead and underground power lines. In installations for underground power lines the coupling device can be installed within power transformer enclosures.

The embodiments shown in FIGS. 4b and 4c allow installation of the coupling device to a "live" underground power line. The method according to the invention for installing the coupling device is illustrated in the simplified flow diagram of FIG. 5. First the coupling device is grounded by connecting the ground terminal 410 of the device 403 to an existing grounding terminal connected to ground. Then port 412 is connected to a port of a customer's RF broadband data signal network. Alternatively, the port 412 is connected first and then the ground terminal 410. After these steps are performed the power supply to the customer's premise is reconnected by first connecting port 416 of the device to a port for feeding power into the customer's premise and then connecting port 418 to the power line. Alternatively, but not preferably, port 418 is connected first. For safety reasons it is essential that the grounding terminal be connected to an existing ground terminal before connecting to the live power line. Preferably, a coupling device comprising a housing connected to the ground terminal is used for providing a device that is safe to touch. This method allows installation of the coupling device with minimum interruption of the power supply to neighboring premises. However, it is preferred that coupling devices for connecting to overhead power lines do not support this method of installation with live power lines in order to protect installation personnel from potential electrocution.

Numerous other embodiments of the invention will be apparent to persons skilled in the art without departing from the spirit and scope of the invention as defined in the appended claims.

What is claimed is:

1. A coupling device for providing a communications link for RF broadband data signals to a power line comprising:
   a first port for connection to a power line;
   a high-pass filter element connected to the first port, the filter element allowing RF broadband data signals to pass while substantially attenuating low frequency signals, wherein the high-pass filter element is connected to the first port via a cable having shielding spaced from the core at a sufficient distance to effectively limit noise resulting from the cable shielding in order to permit extraction of a RE broadband signal absent substantial noise; and,
   a second port connected to the high-pass filter element for connection to a RF broadband data signal line.

2. A coupling device as defined in claim 1 comprising an inductor connected to the high-pass filter element and connected to ground, the inductor providing grounding for low frequency signals but preventing the RE broadband data signals from being grounded.

3. A coupling device as defined in claim 2 wherein the inductor has an inductance value such that a virtual ground for the coupling device is provided while substantial attenuation of the RE broadband data signals is avoided.

4. A coupling device as defined in claim 2 comprising a spark gap connected in parallel to the inductor for protecting the second port and the inductor.

5. A coupling device as defined in claim 4 wherein a self-resonant frequency of the high-pass filter element is high enough to ensure least possible data signal attenuation over the RF broadband data signal frequency range.

6. A coupling device as defined in claim 5 wherein the high-pass filter element is partial-discharge free.

7. A coupling device as defined in claim 6 comprising an impedance matching circuit to match the impedance of the coupling circuit with the impedance of the data signal line.

8. A coupling device as defined in claim 7 wherein the impedance matching circuit comprises a transformer and a coupling capacitor.

9. A coupling device as defined in claim 6 wherein the cable has a core and a concentric neutral shielding and wherein the neutral shielding is spaced from the core a sufficient distance to prevent substantial noise from occurring within the RF broadband signal.

10. A coupling device for providing a communications link for RF broadband data signals to a power line comprising:
    a first port for connection to a power line;
    a high-pass filter element connected to the first port, the filter element allowing RF broadband data signals to pass while substantially attenuating low frequency signals;
    a second port connected to the high-pass filter element for connection to a RF broadband data signal line;
    a drain coil connected to the high-pass filter element and connected to ground, the drain coil providing grounding for low frequency signals but preventing the RE broadband data signals from being grounded; and,
    a protective device connected in parallel to the drain coil for protecting the second port and the drain coil.

11. A coupling device as defined in claim 10 comprising a second protective device to enhance safety for the data signal line.

12. A coupling device for providing a communications link for RF broadband data signals to a power line comprising:
    a first port for connection to a power line; a second port for connection to a power input line of a premise and electrically connected to the first port via a power passthrough for providing power to the premise, wherein the power passthrough comprises a cable having shielding spaced from the core at a sufficient distance to prevent substantial noise from occurring within the RF broadband data signal;
    a high-pass filter element connected to the power passthrough, the filter element allowing RF broadband data signals to pass while substantially attenuating low frequency signals;
    a third port connected to the high-pass filter element for connection to a RF broadband data signal line; a ground terminal for connection to ground;
    a drain coil connected to the high-pass filter element and connected to the ground terminal, the drain coil providing grounding for low frequency signals but preventing the RF broadband data signals from being grounded; and,
    a protective device connected in parallel to the drain coil for protecting the third port and the drain coil.

13. A coupling device as defined in claim 12 wherein the first port, the second port and the power passthrough are integrated in a housing of the coupling device.

14. A coupling device as defined in claim 12 wherein the first port, the second port and the power passthrough form a unit outside a housing of the coupling device and wherein the unit is connected to the coupling device via a flexible power cable.

15. A coupling device for providing a communications link for RF broadband data signals to a power line comprising:
    a first port for connection to a power line;
    a high-pass filter element connected to the first port, the filter element allowing RF broadband data signals to pass while substantially attenuating low frequency signals;
    an inductor connected to the high-pass filter element and connected to ground, the inductor providing grounding for low frequency power signals but preventing the RF broadband data signals from being grounded; and,
    a second port connected to the high-pass filter element for connection to a RF broadband data signal line.

16. A coupling device as defined in claim 15 comprising a grounded housing.

17. A coupling device as defined in claim 16 wherein the high-pass filter element comprises a coupling capacitor.

18. A method for installing a coupling device for providing a communications link for RF broadband data signals to a power line while the power line is provided with a power signal, the method comprising the steps of:
    first connecting a ground terminal of the coupling device to a ground terminal connected to a ground and connecting a port of the coupling device for connection to a RF broadband data signal line to a same port of a RF broadband data signal network;
    second connecting a port of the coupling device for connection to a power input line of a premise to a same port for feeding power to the premise; and,
    third connecting a port of the coupling device for connection to a power line to the power line comprising a power signal.

19. A method as defined in claim 18 wherein the ground terminal includes a housing of the coupling device.

* * * * *